United States Patent [19]

Christ et al.

[11] 3,997,953
[45] Dec. 21, 1976

[54] TEMPERATURE-CONTROLLED ROLL FOR A ROLLING MILL

[75] Inventors: Alfred Christ, Zurich, Switzerland; Rolf Lehmann, Mutschellen, Aargau, Germany

[73] Assignee: Escher-Wyss Limited, Zurich, Switzerland

[22] Filed: Jan. 14, 1976

[21] Appl. No.: 649,062

[30] Foreign Application Priority Data

Jan. 20, 1975   Switzerland .......................... 636/75

[52] U.S. Cl. ............................................ 29/116 AD
[51] Int. Cl.² ........................................ B21B 13/02
[58] Field of Search .... 29/113 AD, 116 R, 116 AD

[56] References Cited

UNITED STATES PATENTS

| | | | |
|---|---|---|---|
| 2,605,487 | 8/1952 | Bugg | 29/116 R X |
| 3,131,625 | 5/1964 | Kusters et al. | 29/116 AD X |
| 3,336,648 | 8/1967 | Alexeff | 29/113 AD |
| 3,389,450 | 6/1968 | Robertson | 29/116 AD |
| 3,430,319 | 3/1969 | Skaugen | 29/116 AD |
| 3,587,152 | 6/1971 | Hold | 29/116 AD |
| 3,726,338 | 4/1973 | Sorenson | 29/116 AD X |
| 3,802,044 | 4/1974 | Spillmann et al. | 29/116 AD |
| 3,846,883 | 11/1974 | Biondetti | 29/116 AD |

FOREIGN PATENTS OR APPLICATIONS 1,438,943   4/1966   France ........................ 29/116 AD

*Primary Examiner*—Alfred R. Guest
*Attorney, Agent, or Firm*—Pennie & Edmonds

[57]   ABSTRACT

A roll for rolling mill, preferably a sag-compensating roll having hydrostatic support piston means, is provided with one or more heat-control devices each comprising a piston mounted in a chamber supported by the support beam of the roll and provided with an operating plate facing the inner surface of the roll shell. The surface of the operating plate has grooved ducts connected with the interior of the chamber to supply heat-control liquid to a thin gap produced between the operating plate and the roll shell. Such ducts may terminate short of the boundary of the plate and intermediate ducts may extend to the boundary. With a plurality of heat-control devices spaced in a row, overlapping oblique parallelogram plates may be employed, with connecting pins to prevent relative rotation therebetween.

12 Claims, 4 Drawing Figures

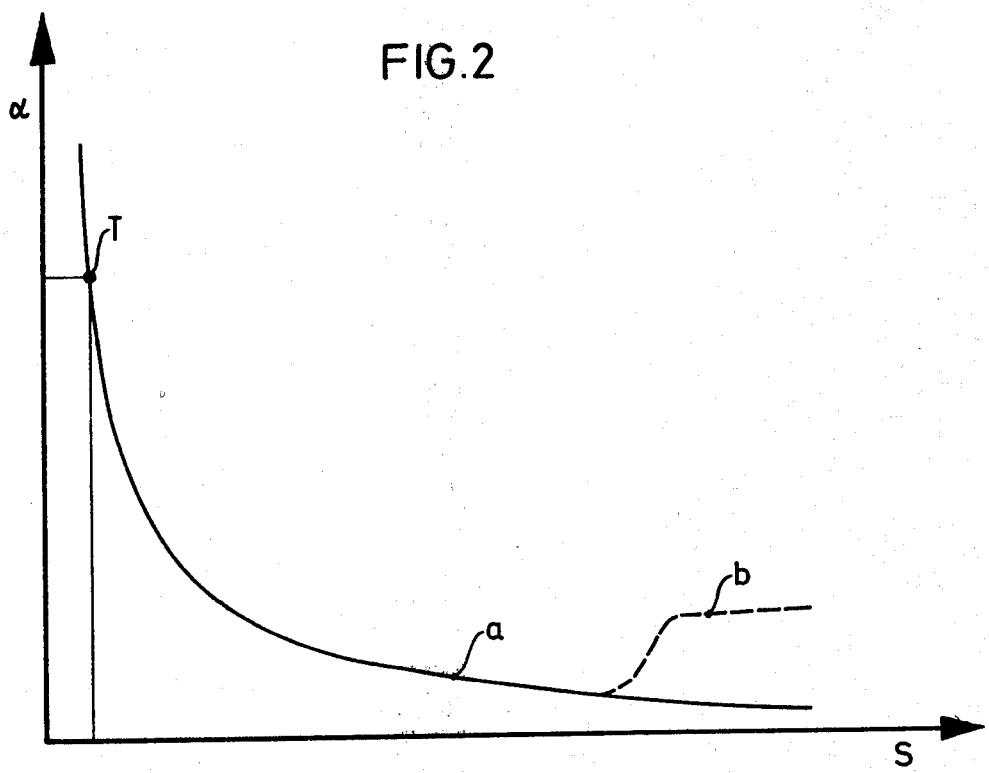

TEMPERATURE-CONTROLLED ROLL FOR A ROLLING MILL

This invention relates to a roll for a rolling mill, comprising a roll sheet rotatable about a fixed beam, the temperature of the roll shell being controlled by a liquid heat vehicle introduced between the fixed beam and the roll shell.

In rolls of this kind as disclosed, for example, by French Pat. specification No. 1,438,943, the roll barrel may be heated or cooled by a pressure medium, e.g. pressure oil, at a suitable temperature. On the other hand, German Pat. application No. 2,420,324 suggests that the hydraulic medium fed to the support elements of rolls having hydrostatic support elements in the form of pistons, for example as disclosed in U.S. Pat. No. 3,802,044, may be heated or cooled to give a required roll temperature.

It has been found that the heat transfer between the liquid vehicle and the roll shell increases in direct proportion to the thinness and length of the gap provided between the support element and the inner surface of the roll shell. From this aspect, the support of heat vehicle to the hydrostatic support elements is superior, as far as heat transfer is concerned, to an arrangement according to the said French Pat. specification No. 1,438,943.

The object of the invention is a further improvement in the heat transfer between the heat vehicle and the inner surface of the roll shell so that a heat vehicle of lower temperature will be sufficient, for example, to achieve a given surface temperature of the roll shell.

To this end, the roll according to the invention is characterized by at least one heat-control device including a piston mounted in a chamber supported by the fixed beam. The chamber may be formed in the beam or in a part attached thereto. Hydraulic fluid under pressure is introduced into the cylinder to the piston toward the inner surface of the roll shell. The piston is provided with an operating plate having at least one outlet duct for the emergence of the heat vehicle into a gap between the surface of the operating plate and the inner surface of the roll shell.

In this manner, the supporting function for the roll shell is separated from the heating function. By means of the heat-control device it is possible to obtain a favorable heat transfer between the heat vehicle and the roll shell irrespective of the way in which the roll shell is supported.

Preferably, the piston of the heat-control device is guided in a cylindrical chamber in the support beam and is formed with at least one throttle bore connecting the chamber to the outlet orifices. The surface of the operating plate may be provided with parallel ducts, adjacent ducts being alternately connected to the cylindrical chamber and to the interior of the roll. In this way it is possible to provide the maximum possible gap surface on an operating plate of given size and, as already stated, there is a particularly good heat transfer in such a gap. Advantageously the ducts are disposed in parallel relationship to the roll axis.

Preferably, a plurality of heat-control members are disposed in a row parallel to the roll axis, connecting elements being provided between adjacent operating plates to prevent relation rotation thereof.

The operating plates may have the form of parallelograms with two sides extending in parallel relationship to the roll axis, and the other sides extending at an angle thereto so that there is an overlap of adjacent sides of the plates with respect to the circumferential direction of the roll shell.

As already stated, the roll may be a sag-compensating roll having at least one hydrostatic support device in the form of a piston and extending in seal-tight relationship into a pressure chamber formed on the support beam and having a support surface on which the roll shell is slidably supported, the support surface comprising at least one hydrostatic bearing pocket for the hydraulic pressure medium, said pocket being connected to the pressure chamber by a throttle duct. The heat-control member or members are then located remote from the hydrostatic support means, for example in a row which is angularly displaced from a row of support devices.

The invention will be explained with reference to a specific embodiment diagrammatically illustrated in the drawings wherein:

FIG. 2 is a graph showing the heat transfer coefficient as a function of the gap width of the heat-control device;

Figure 1:
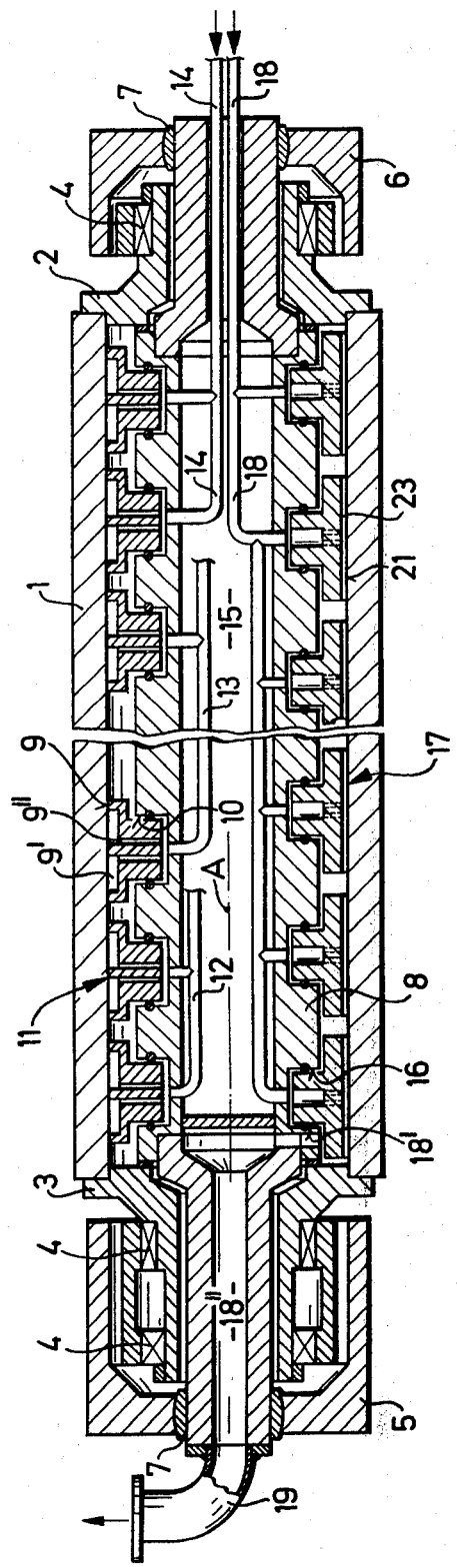
FIG. 1 is a longitudinal section of a roll according to the invention.

The roll shown in section in FIG. 1 comprises a shell 1 provided with two hollow journals 2 and 3 which are rotatably mounted in supports 5 and 6 by roller bearings 4. A central beam 8 is also mounted in supports 5 and 6 by spherical bushings 7. The beam 8 is formed with cylindrical bores 10 for hydrostatic support pistons 11 of the kind described in U.S. Pat. No. 3,802,044. Hydraulic fluid under pressure is fed in known manner to the support elements via conduits 12, 13, 14 provided in a cavity 15 of the beam 8.

At a point remote from the support elements 11, the beam 8 is also formed with bores 16 into which piston portions of the heat-control devices 17 extend. The latter are connected to a conduit 18 for a liquid heat control vehicle. In the present case this heat control vehicle has the same composition as the hydraulic pressure medium which is fed to the supporting elements 11. It is an hydraulic oil which may, however, have a different pressure and a different temperature for the heat-control devices 17 from the pressure and temperature for the supporting elements 11. Although the pistons of the heat-control devices function in a manner similar to those of the support members, the areas and pressures are selected so that the forces exerted on the roll shell by the heat-control devices are small compared to those exerted by the support devices. The hydraulic medium flowing away from the support devices 11 and the heat-control devices 17 is extracted via ducts 18', 18" and a pipeline 19.

Figure 4:
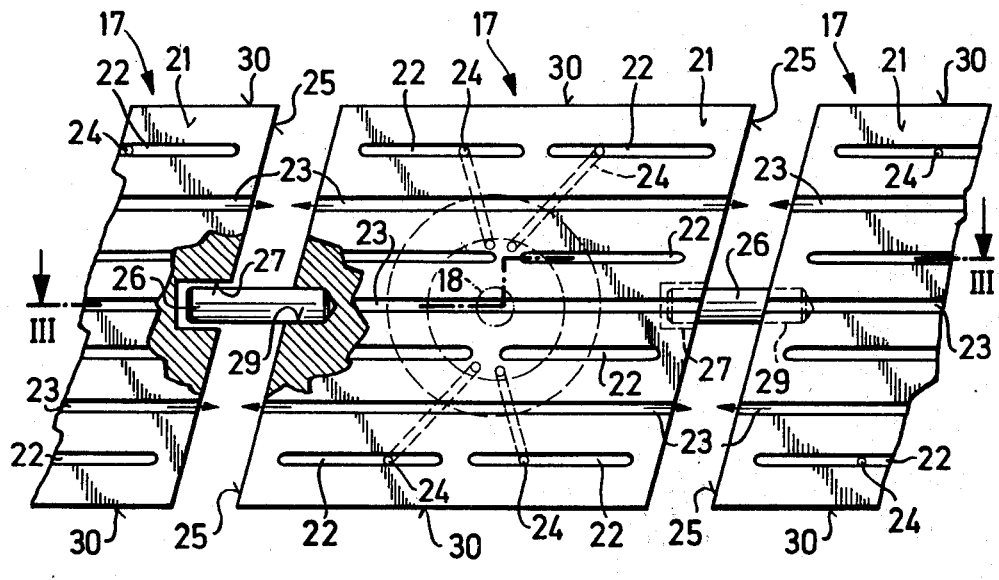
FIG. 4 is a face view of the operating plate of the member shown in FIG. 3, again together with parts of adjacent plates.
Figure 3:
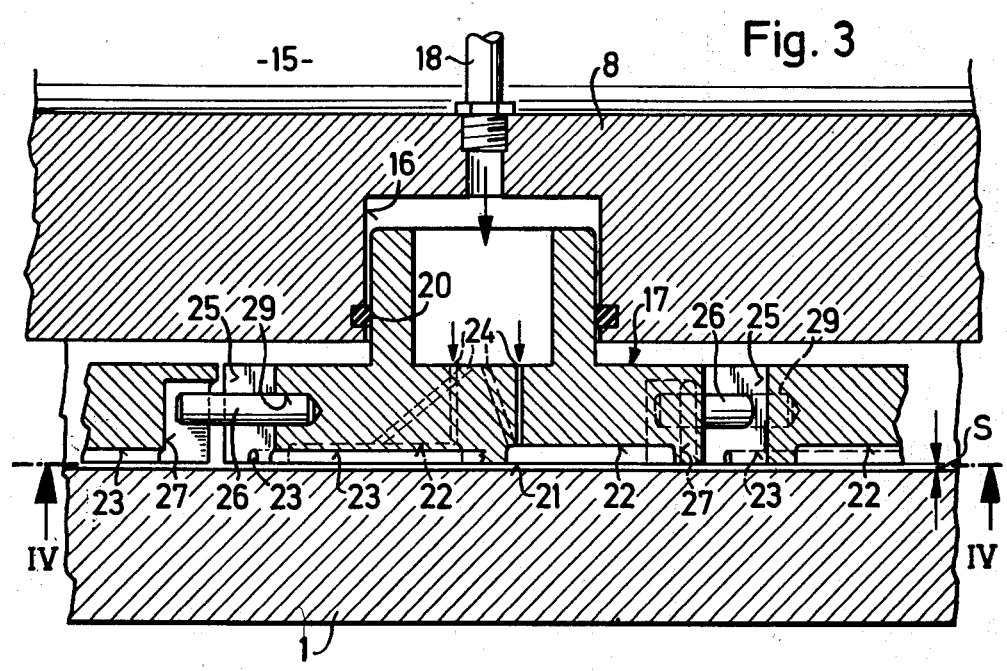
FIG. 3 is a section of a heat-control device of the support beam and portions of adjacent operating plates.

FIGS. 3 and 4 show the construction of one of the heat-control devices 17 of an axial row of such devices.

Heat-control device 17 is guided in the manner of a piston in the bore 16, in which it is sealed by a seal 20. Member 17 has an operating plate 21 formed with parallel grooved ducts 22 and 23 in the outer surface thereof. Referring to FIG. 4, ducts 22 are each connected by throttle bores 24 to the cylindrical chamber formed by the bore 16. The ducts 23 serve to receive heat-control liquid emerging from the ducts 22 and guide it to the interior of the roll shell. Ducts 22 terminate short of the boundary of the operating plate 11, whereas ducts 23 extend to the boundary.

As will be seen from FIG. 1, the row of heat-control devices 17 extends in parallel relationship to the axis A of the roll shell 1 and of the beam 8.

As well be clear, particularly from FIG. 4, the operating plate 21 is in the form of a parallelogram, the sides 20 of which extend in parallel relationship to the roll axis. The other two sides 25 extend at an angle to the sides 30 so that there is an overlap of these sides of adjacent elements 21 with respect to the circumferential direction of the roll shell 1. To prevent the members 17 from rotating relatively to one another, they are provided with pins 26 engaging in notches 27 in adjacent plates 21.

In the construction of the roll according to the invention with heat-control devices 17, the heat-control vehicle is introduced into a gap S between each operating plate 21 and the inner surface of the roll shell 1. The gap is produced by the pressure on the piston and the counteracting pressure of the liquid issuing between the operating plate 21 and the roll shell, in accordance with known principles. In the embodiment shown in FIGS. 3 and 4, the gap is very long, being of a length unattainable with the normal support elements according to U.S. Pat. No. 3,802,044. A gap flow forms on each side of each duct 22 and extends as far as the periphery of the operating plate 21 and to the next duct 23. Since a thin and very stable gap can be obtained as a result of the hydraulic action, the resulting heat transfer is a multiple of that attainable with the known space heating according to French Pat. specification No. 1,438,943 or with the hydraulic fluid of the support elements.

FIG. 2 is a graph showing the heat transfer coefficient $\alpha$ as a function of the size of the gap S in the case of laminar flow (curve $a$) and in the case of turbulent flow (curve $b$). It will be clear from FIG. 2 that the heat transfer coefficient $\alpha$ has a high value in the region of point T, which corresponds to the preferred range of operation of the heat-control means described. Operation in this range can be attained by suitable choice of effective piston and operating plate areas, together with the hydraulic pressure and throttling bore dimensions, in accordance with known principles.

As already stated, the hydrostatic support elements 11 are constructed in the manner disclosed in U.S. Pat. No. 3,802,044. They contain support surfaces 9 with hydrostatic bearing pockets 9' connected to the pressure chamber 10 via throttle ducts 9''. In normal use a counter-roll will be mounted above the sag-compensated roll as seen in FIG. 1, and the support elements 11 will prevent sag in the roll shell 1 during the rolling of material introduced between the cooperating rolls. The roll of heat-control devices 17 will be on the opposite side, away from the counter-roll, and maintains a desired temperature of the roll shell as it rotates.

We claim:

1. In a sag-compensating roll for a rolling mill including a roll shell rotatable about a support beam, and hydrostatic supporting piston means mounted on said support beam for exerting support forces on said shell, temperature control means for said shell comprising at least one heat-control device remote from said supporting piston means, said heat-control device comprising a piston mounted in a chamber supported by said beam and an operating plated on said piston facing the inner surface of said roll shell, conduit means for introducing a heat-control liquid vehicle into said chamber to press said operating plate toward the inside of said shell, and at least one grooved outlet duct in the surface of said operating plate connected with the interior of said chamber, said piston and heat-control liquid vehicle producing a gap between said operating plate and said shell in which the heat-control liquid vehicle flows.

2. A roll according to claim 1 including a throttle bore for connecting said outlet duct with the interior of said chamber.

3. A roll according to claim 2 including a plurality of parallel grooved outlet ducts in the surface of said operating plate, alternate ducts terminating short of the boundary of said operating plate and being connected to the interior of said chamber through respective throttle bores, and the ducts between said alternate ducts extending to the boundary of said operating plate.

4. A roll according to claim 3 in which said ducts are parallel to the roll axis.

5. A roll according to claim 1 including a plurality of said heat-control devices spaced in a row parallel to the roll axis, and connecting means for connecting adjacent operating plates of said heat-control devices to prevent relative rotation therebetween.

6. A roll according to claim 1 including a plurality of said heat-control devices spaced in a row parallel to the roll axis, the operating plates of said heat-control devices being in the form of oblique parallelograms having respective pairs of sides parallel to the roll axis and the other sides at an angle such that adjacent sides overlap with respect to the circumferential direction of the roll shell.

7. A roll according to claim 1 including a plurality of said heat-control devices spaced in a row parallel to the roll axis, the operating plates of said heat-control devices being in the form of oblique parallelograms having respective pairs of sides parallel to the roll axis and the other sides at an angle such that adjacent sides overlap with respect to the circumferential direction of the roll shell, each of said operating plates having a plurality of parallel grooved outlet ducts in the outer surface thereof parallel to the roll axis, alternate ducts of each of said operating plates terminating short of the boundary of the respective plate and being connected to the interior of the respective chamber through throttle bores, the ducts between said alternate ducts of each plate extending to the boundary of the plate, and pin means for connecting adjacent operating plates to prevent relative rotation therebetween.

8. A temperature-controlled roll for a rolling mill comprising a roll shell rotatable about a fixed beam, at least one heat-control device including a piston mounted in a chamber supported by said beam and an operating plate on said piston facing the inner surface of said roll shell, conduit means for introducing a heat-control liquid vehicle into said chamber to press said operating plate toward the inside of said shell, a plurality of parallel grooved outlet ducts in the surface of said operating plate, alternate ducts terminating short of the boundary of said operating plate and being connected to the interior of said chamber through respective throttle bores, and the ducts between said alternate ducts extending to the boundary of said operating plate, said piston and heat-control liquid vehicle producing a gap between said operating plate and said shell in which the heat-control liquid vehicle flows.

9. A roll according to claim 8 in which said ducts are parallel to the roll axis.

10. A roll according to claim 8 including a plurality of said heat-control devices spaced in a row parallel to the roll axis, and pin means for connecting adjacent operating plates of said heat-control devices to prevent relative rotation therebetween.

11. A roll according to claim 8 including a plurality of said heat-control devices spaced in a row parallel to the roll axis, the operating plates of said heat-control devices being in the form of oblique parallelograms having respective pairs of sides parallel to the roll axis and the other sides at an angle such that adjacent sides overlap with respect to the circumferential direction of the roll shell.

12. A roll according to claim 11 in which said ducts are parallel to the roll axis and including pin means for connecting adjacent operating plates of said heat-control devices to prevent relative rotation therebetween.

* * * * *